June 30, 1959     L. C. HOFFMAN     2,892,734
VITREOUS ENAMEL COLORING COMPOSITION
Filed March 16, 1956
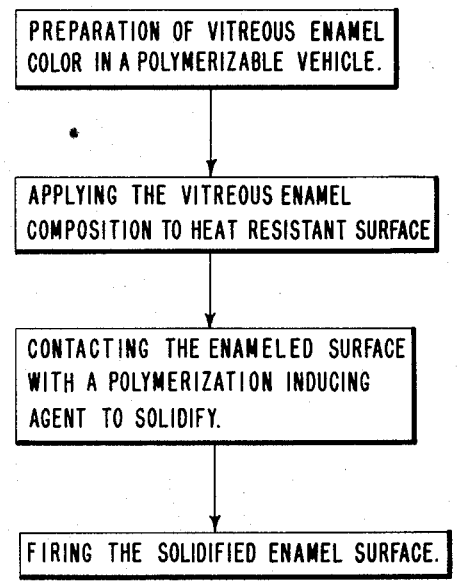
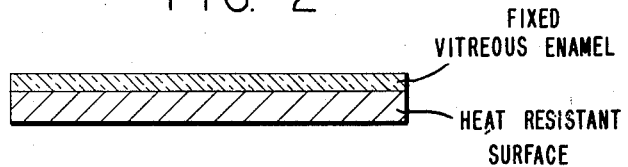
INVENTOR
LEWIS C. HOFFMAN
BY
ATTORNEY

United States Patent Office 2,892,734
Patented June 30, 1959

2,892,734

VITREOUS ENAMEL COLORING COMPOSITION

Lewis C. Hoffman, Scotch Plains, N.J., assignor to E. I. du Pont de Nemours and Company, Wilmington, Del., a corporation of Delaware Application March 16, 1956, Serial No. 571,875

5 Claims. (Cl. 117—46)

This invention relates to viteous enamel color compositions, more particularly it relates to such compositions composed primarily of finely divided inorganic pigments, finely ground vitreous enamel frit and a liquid vehicle. Such compositions are useful for applying vitreous enamel colors to ceramic (glass, porcelain, china, refractories and the like) and metal surfaces.

Vitreous enamel color compositions have been used for many years in ceramic and metal surface decoration. These materials are commonly used by formulating the same in the form of a liquid or paste and squeegeeing the same through a screen stencil to a surface to be decorated and then firing the decoration to fuse the vitreous enamel and volatilize the vehicle from the surface.

Prior to this invention such vitreous enamel color compositions were prepared with air drying or thermofluid vehicles. These previously known compositions are satisfactory for use in applying and firing a single color but have certain disadvantages when applying a number of successive colors. With air drying vehicles it is necessary to subject the surfaces to which the color compositions are applied to a drying operation after each but the last applied color. With thermofluid vehicles, which are applied hot and solidify by freezing at room temperature, consecutively applied colors cause a melting and blurring of previously applied colors. To overcome these disadvantages the art has resorted to the application, first, of a color containing a thermofluid vehicle followed by application of a color containing an air drying vehicle. This procedure is disadvantageous since it makes necessary the use of two types of compositions.

It is an object of this invention to prepare a new type of vitreous enamel color composition.

It is another object to prepare vitreous enamel color compositions which can be applied as rapidly successive color applications without affecting previously applied colors.

It is another object to prepare vitreous enamel color compositions which need not be melted for application and which need not be dried between successive color applications.

It is also an object of this invention to provide a new method of applying vitreous enamel color compositions.

Other objects will appear hereinafter.

The objects of this invention may be accomplished, in general, by thoroughly intermixing a finely divided vitreous enamel color, composed of a glass frit and an inorganic pigment and a polymerizable liquid vehicle that upon contact with a polymerization inducing agent will rapidly set up or solidify by polymerization.

The invention is illustrated in the accompanying drawing in which, Figure 1 is a flow sheet drawing disclosing the chief steps involved in carrying out the process of this invention, and Figure 2 is a cross-sectional view disclosing the finished product after firing comprising a heat resistant surface and a fixed vitreous enamel surface.

A great host of polymerizable materials are known in the arts. Not all such materials will have commercial utility as vehicles for vitreous enamel color compositions. Such polymerizable vehicles must be stable or substantially unaffected for a period of at least 3 to 4 hours under normal atmospheric conditions. Secondly, they must be solidifiable within a period of three minutes or less, preferably within seconds, by application of a polymerization inducing agent. Furthermore, for most purposes it must be removed by volatilization at firing temperatures used in subsequent firing of the vitreous frit.

Several different polymerizable materials have been found to be useful as vehicles for vitreous enamel color compositions. Other polymerizable materials substantially unaffected for 3 to 4 hours under normal atmospheric conditions but solidifiable within a period of three minutes or less would be equally useful.

The preferred class of polymerizable materials for use in this invention as vehicles are polyester- and polyether-modified diisocyanates. Particularly desirable results have been obtained with the reaction product of polytetramethyleneether glycol and toluene-2,4-diisocyanate. Other polyester-modified diisocyanates include those from ethylene glycol, propylene glycol, glycerol, sorbitol, polyethylene glycol or triphenylolpropane and adipic or other dibasic acid reacted with a diisocyanate, for example, 2,4-toluene diisocyanate, dianisidine diisocyanate, methylene-bis(4-phenyl isocyanate), metaphenylene diisocyanate, 4,4′ - methylene - bis(o - tolylisocyanate, 4′-p-isocyanato-phenoxy) meta-phenylene diisocyanate, 4,4′-methylene-bis(o-chlorophenylisocyanate).

These diisocyanate modified polyethers and polyesters may be rapidly solidified by polymerization (either linear or cross-linking) through application thereto of active hydrogen containing compounds, for example, water, ammonia, an amine such as ethylenediamine, 1,2-propane-diamine or any other di- or multi-functional amine. The preferred polymerization inducing agent for these materials are diamines where the nitrogens are separated by less than 6 carbon atoms in a straight chain.

In many cases it has been found desirable to add a solvent to the polyester- or polyether-modified diisocyanate in order to obtain suitable liquidity. The following solvents have been found satisfactory for this purpose: alcohol esters of aliphatic and aromatic acids boiling above 150° C. e.g. di-n-butyl phthalate, dicapryl adipate, kerosene, tetrahydronaphthalene, nitrobenzene, butyl Cellosolve acetate and high boiling ketones such as camphor. A mixture of 54% di-n-butylphthalate and 46% tetrahydronaphthalene was found particularly desirable. The solvent could be any liquid which would not evaporate too fast and cause drying of the paste on the screen and which does not contain active hydrogens to react with the diisocyanate product prematurely.

Shelf-life of unstabilized pastes produced from diisocyanates as above stated is about 3 to 4 hours. Such shelf-life may be, if desired, increased to 100–170 hours by the addition of a stabilizer to the vehicle. Substances such as phthalic acid and 2-mercaptobenzothiazole will function as stabilizers for this purpose if added in small amounts, i.e., 0.5% to 5% by weight of the polyether or polyester modified diisocyanate.

Favorable results have also been obtained by the use of the following polymerizable materials as vitreous enamel vehicles:

(1) Boiled linseed oil
(2) Epoxide resins
(3) Hexamethylene diamine, and
(4) Rosin amine Boiled linseed oil may be mixed with the vitreous enamel color to a workable consistency and squeegeed on a glass surface. The squeegeed design is contacted with vapors of $SCl_2$ arising from a heated container.

The boiled linseed oil vehicle solidified instantaneously.

Epoxide resins, for example glycidyl polyethers of dihydric phenols, obtained by reacting a polyfunctional phenol, such as resorcinol or bis-phenol(2,2-bis(4-hydroxyphenyl)propane) with an excess of epichlorohydrin, or glycidyl polyethers of polyhydric alcohols obtained by reacting a polyhydric alcohol, such as glycerol, with an epoxy ether, such as bis(2,3-epoxypropyl) ether may be compounded with 1 to 6 times its weight of a vitreous enamel, with or without a non-reacting solvent to maintain the mass fluid, and the resulting paste squeegeed on a metal or ceramic surface as a design. The design may be rapidly solidified by contacting the same with a diamine such as ethylenediamine or an ethylenediamine-water mixture. Epoxide resins of this type are described and exemplified in U.S. Patent No. 2,732,367.

Hexamethylene diamine in aqueous solution may likewise be mixed with a vitreous enamel color and designs thereof coated on metal or ceramic surfaces can be solidified in two to three minutes by contact with sebacyl chloride.

Rosin amine, prepared by reacting rosin with ammonia constitutes still another polymer which can be rapidly solidified by spraying with glacial acetic acid.

The following examples are given to set forth in detail certain preferred processes for the preparation of vitreous enamel color compositions with vehicles that will solidify or set up within a period of less than about three minutes, and are particularly advantageous for use in multi-color decoration of metal and ceramic surfaces with vitreous enamel designs.

*Example I*

To 7 parts of a polyurethane prepared by reacting 1731 parts by weight of polytetramethyleneether glycol having a molecular weight of about 3000 with about 3 parts water and 230 parts 2,4-toluene diisocyanate are added 7 parts di-n-butylphthalate, 6 parts tetrahydronaphthalene and 74 parts of a vitreous enamel color containing 10% by weight of inorganic pigment of a desired color and 90% by weight of a glass frit composed of 56.9% PbO, 27.1% $SiO_2$, 0.8% $TiO_2$, 3.8% $Na_2O$, 5.5% $B_2O_3$, 1.7% ZnO and 4.2% $ZrO_2$ expressed as wt. percent. The mixture is milled in a roll mill to thoroughly admix the materials with each other.

The milled mixture is placed in screen stencil and a beverage bottle placed in a conventional rotating holder and conveyed under the screen stencil. A squeegee pressed the mixture through the stencil onto the bottle after which the bottle is conveyed into a spray area where a spray composed of 40 parts by weight of ethylenediamine and 60 parts by weight of water is directed onto the area of the bottle containing the design. The stenciled area on the bottle set up in about three seconds. Additional colors are superimposed on the stenciled area of the bottle and similarly set up. The bottle is now transferred to a firing lehr where the superimposed colors are fired to produce a beautiful clear bright glossy vitreous enamel design on the bottle.

*Example II*

The method described in Example I was followed to position a plurality of superimposed colors followed by the superimposition of a last color composition comprising a vitreous enamel color in an air-dry type of vehicle. The bottle was immediately thereafter placed in a firing lehr, without intermediate air-drying. The fired design showed a beautiful clear glossy multi-color design.

*Example III*

The method of Example I was repeated except that in place of a spray of ethylenediamine-water directed onto the bottle, the bottle was passed through a chamber containing ethylenediamine vapor obtained by heating ethylenediamine to a temperature of 110° C.–140° C.

*Example IV*

The method of Example I was repeated using as the vehicle milled with the vitreous enamel color, the reaction product of triethylene glycol and 2,4-toluene diisocyanate by mixing the glycol and diisocyanate in the proportion of 1:1.2 by weight and allowing the same to stand 24 hours and mixing with di-n-butylphthalate as a solvent in the proportion of 3.5:6.5 by weight. The vehicle and vitreous enamel color were blended in the proportion of 1 part vehicle to 4 parts enamel color, by weight.

The resulting fired enamel was comparable in quality and appearance to enamel of Example I.

*Example V*

A polyester, having a hydroxyl number of 165 and an acid number of 5.2, was prepared by mixing 3 mols adipic acid, 1 mol phthalic anhydride, 4 mols ethylene glycol and 1 mol glycerine.

The resulting polyester was mixed with 2,4-toluene diisocyanate in the proportion, by weight of polyester to diisocyanate of 1:0.256. The mixture is heated to 70° C. for two hours and used as the isocyanate modified product in the method of Example I with equally desirable results.

*Example VI*

Boiled linseed oil is mixed with the vitreous enamel color of Example I and applied as a decoration through a stencil as described in that example. The bottle with the freshly applied color composition is passed into contact with vapors of $SCl_2$ in a closed container. The design solidifies instantaneously.

*Example VII*

Example I is followed using as the vehicle an epoxide resin obtained by reacting bis-phenol with an excess of epichlorhydrin and adding 50% by weight of a 50–50 mixture of xylene and Cellosolve (ethylene glycol ethyl ether). A stenciled design on a bottle solidified rapidly in the presence of a spray of ethylene diamine.

*Example VIII*

The method of Example I is followed using as the vehicle a 72% aqueous solution of hexamethylenediamine. Stenciled designs dipped in sebacyl chloride solidified within three minues.

*Example IX*

Again following the method of Example I using as a vehicle "Rosin Ammine D," a rosin amine sold by Hercules Powder Co. of Wilmington, Delaware, a stenciled design was solidified within three minutes by spraying the same with glacial acetic acid.

The solidified designs in all of the above examples showed a clear outline in bright colors of the intended design. These solidified designs were readily fired to produce a vitreous enamel decoration of metal glass or the like.

All of the above-mentioned vehicles are composed mainly of polymerizable materials, i.e., either polymerizable linearly or by cross-linking, which upon application of a polymerization inducing agent will solidify within a period of not to exceed three minutes. The polymerization inducing agent may be a polymerization catalyst, a cross-linking agent or a reactant.

The vitreous enamel color compositions of the present invention have the advantage over previously shown enamel color compositions in that they may be applied with repeated color applications at room temperature without materially affecting previously applied colors and without the necessity of subjecting previously applied colors to a time-consuming drying operation.

Throughout the specification and claims, any reference to parts, proportions and percentages refers to parts, proportions and percentages by weight unless otherwise specified.

I claim:

1. A vitreous enamel color composition for screen stencil application in overlapping colors to metal and ceramic surfaces and subsequent firing to fuse the enamel composition, said composition comprising one to six parts by weight of a glass frit containing an inorganic pigment dispersed in one part by weight of a liquid vehicle consisting essentially of a polymerizable diisocyanate modified polymer of the class consisting of polyethers and polyesters substantially unaffected for a period of at least three hours under normal atmospheric conditions but solidifiable by polymerization within a period of not to exceed three minutes by application of a polymerization inducing agent taken from the group consisting of water, ammonia and diamines wherein the nitrogen atoms are separated by less than 6 carbon atoms.

2. A vitreous enamel color composition for screen stencil application in overlapping colors to metal and ceramic surfaces and subsequent firing to fuse the enamel composition, said composition comprising one to six parts by weight of a glass frit containing an inorganic pigment dispersed in one part by weight of a liquid vehicle consisting essentially of a polymerizable diisocyanate modified polymer from the group consisting of polyethers and polyesters substantially unaffected for a period of at least three hours under normal atmospheric conditions but solidifiable by polymerization within a period of not to exceed three minutes by application of a diamine wherein the nitrogen atoms are separated by less than 6 carbon atoms.

3. A vitreous enamel color composition for screen stencil application in overlapping colors to metal and ceramic surfaces and subsequent firing to fuse the enamel composition, said composition comprising one to six parts by weight of a glass frit containing an inorganic pigment dispersed in one part by weight of a liquid vehicle consisting essentially of a glycidyl polyether of a dihydric alcohol substantially unaffected for a period of at least three hours under normal atmospheric conditions but solidifiable by polymerization within a period of not to exceed three minutes by application of a diamine wherein the nitrogen atoms are separated by less than 6 carbon atoms.

4. The method of decorating a highly heat-resistant surface which comprises the steps of applying to said surface a vitreous enamel color composition comprising one to six parts by weight of a glass frit containing an inorganic pigment dispersed in one part by weight of a liquid vehicle consisting essentially of a polymerizable diisocyanate modified polymer of the class consisting of polyethers and polyesters substantially unaffected for a period of at least three hours under normal atmospheric conditions but solidifiable by polymerization within a period of not to exceed three minutes by application of a polymerization inducing agent, solidifying said color composition with a polymerization inducing agent taken from the group consisting of water, ammonia and diamines wherein the nitrogen atoms are separated by less than 6 carbon atoms, and firing said vitreous enamel color compositions to volatilize said vehicle and fuse said colors to said surface.

5. The method of decorating a highly heat-resistant surface which comprises the steps of applying to said surface a vitreous enamel color composition comprising one to six parts by weight of a glass frit containing an inorganic pigment dispersed in one part by weight of a liquid vehicle consisting essentially of a glycidyl polyether of a dihydric alcohol substantially unaffected for a period of at least three hours under normal atmospheric conditions but solidifiable by polymerization within a period of not to exceed three minutes by application of a polymerization inducing agent, solidifying said color composition with a polymerization inducing agent taken from the group consisting of water, ammonia and diamines wherein the nitrogen atoms are separated by less than 6 carbon atoms, and firing said vitreous enamel color compositions to volatilize said vehicle and fuse said colors to said surface.

References Cited in the file of this patent
UNITED STATES PATENTS

| | | |
|---|---|---|
| 2,528,934 | Wiles | Nov. 7, 1950 |
| 2,607,701 | Jessen | Aug. 19, 1952 |
| 2,707,177 | Skiff et al. | Apr. 26, 1955 |
| 2,719,090 | Morehead | Sept. 27, 1955 |
| 2,732,367 | Schokal | Jan. 24, 1956 |
| 2,734,045 | Nelson | Feb. 7, 1956 |
| 2,756,493 | Hall et al. | July 31, 1956 |